United States Patent [19]
Stanley

[11] Patent Number: 5,873,170
[45] Date of Patent: Feb. 23, 1999

[54] HAND SAW

[76] Inventor: John Stanley, 13 Armour Avenue, Ballymoney, Ireland, BT53 7AG

[21] Appl. No.: 682,638

[22] PCT Filed: Jan. 24, 1995

[86] PCT No.: PCT/GB95/00138

§ 371 Date: Oct. 16, 1996

§ 102(e) Date: Oct. 16, 1996

[87] PCT Pub. No.: WO95/19863

PCT Pub. Date: Jul. 27, 1995

[30] Foreign Application Priority Data

Jan. 25, 1994 [GB] United Kingdom .................. 9401334

[51] Int. Cl.$^6$ .................................................. B27B 21/00
[52] U.S. Cl. .............................. 30/519; 30/508; 30/509; 30/510; 30/513; 30/514; 30/518
[58] Field of Search ............................. 30/509, 508, 510, 30/511, 512, 513, 514, 518, 519

[56] References Cited

U.S. PATENT DOCUMENTS

| | | | |
|---|---|---|---|
| 589,719 | 9/1897 | Griffin | 30/510 |
| 1,259,799 | 3/1918 | Starrett | 30/511 X |
| 1,292,275 | 1/1919 | Duncan | 30/512 X |
| 1,380,628 | 6/1921 | Barner | 30/512 |
| 1,470,897 | 10/1923 | Voltz | 30/508 |
| 1,565,861 | 12/1925 | McIntire | 30/512 |
| 2,058,107 | 10/1936 | Priest | 30/510 |
| 2,173,365 | 9/1939 | Kessler | 30/510 |
| 2,309,816 | 2/1943 | Allen | 30/512 |
| 2,526,438 | 10/1950 | Thompson et al. | 30/510 |
| 2,559,686 | 7/1951 | Suhre | 30/510 |
| 3,038,177 | 6/1962 | Machtle | 30/511 X |
| 4,499,936 | 2/1985 | Nilsson | 30/512 |
| 5,063,675 | 11/1991 | Michas et al. | 30/513 |

FOREIGN PATENT DOCUMENTS

228759 A1  10/1985  Germany .................. 30/513

*Primary Examiner*—M. Rachuba
*Assistant Examiner*—Charles Goodman
*Attorney, Agent, or Firm*—Howell & Haferkamp, L.C.

[57] ABSTRACT

A saw is described as having an adjustable handle wherein the angle of the handle in relation to the longitudinal axis of the saw blade and blade holder is rotatably adjustable.

20 Claims, 6 Drawing Sheets

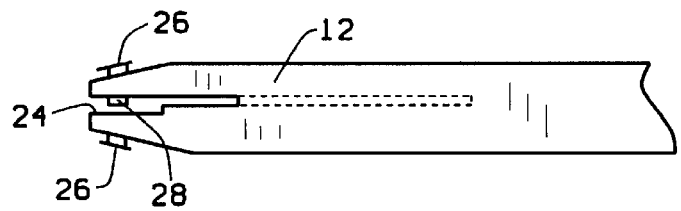
FIG. 16A
FIG. 16C
FIG. 16B
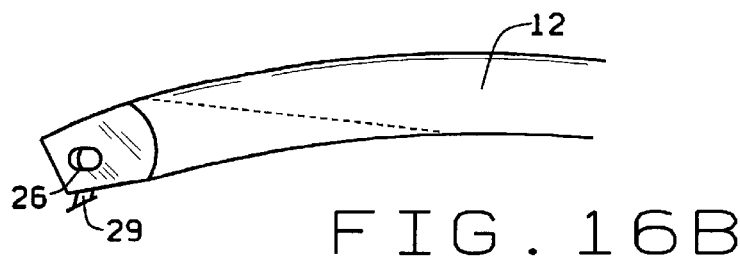
FIG. 17
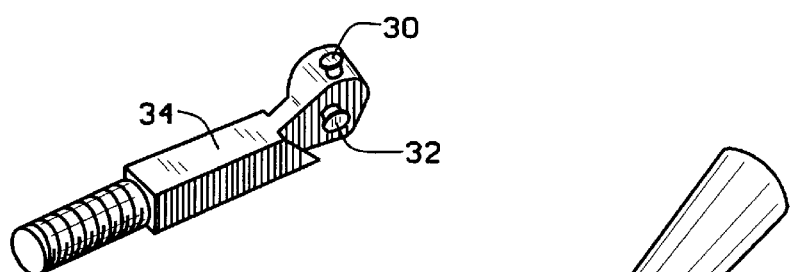
FIG. 8

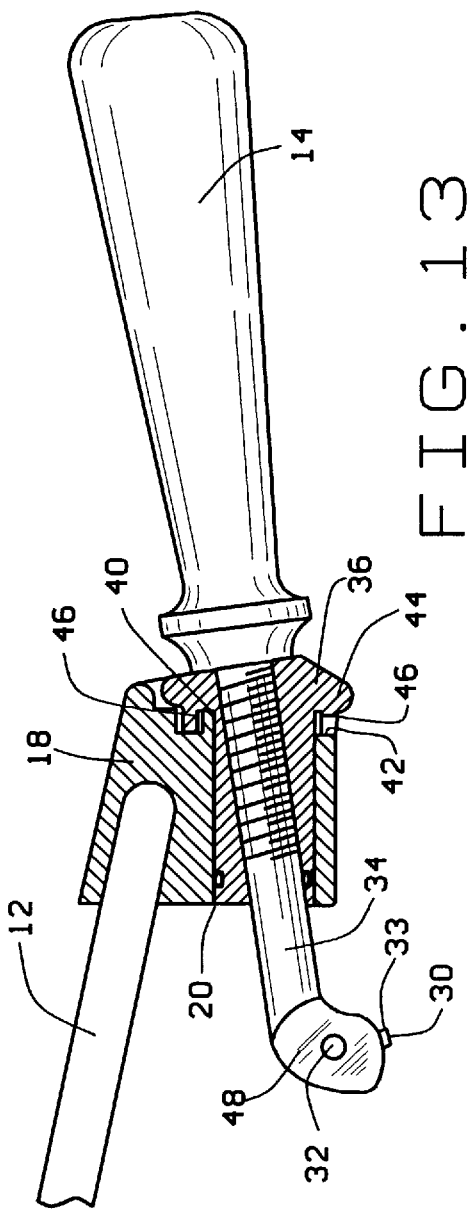
FIG. 13
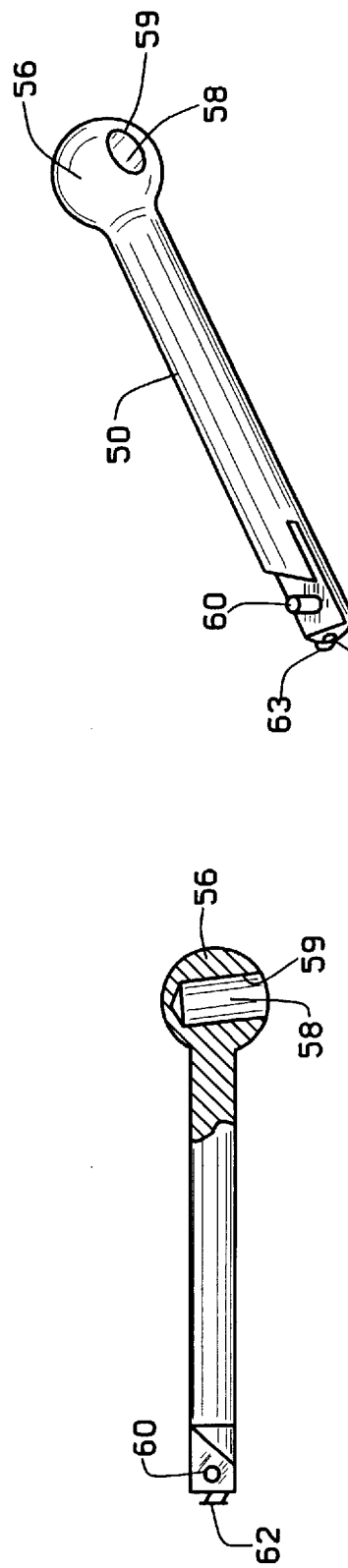
FIG. 12A
FIG. 12B

HAND SAW

BACKGROUND OF THE INVENTION

1. Field of the Invention

This invention concerns saws, especially hacksaws.

2. Description of the Prior Art

Hacksaws are common hand tools and can be used for cutting through a variety of materials. Usually a hacksaw blade is replaceable, so that a hacksaw can have a long useful life. However, a hacksaw is limited in its applications because of its rigidity and cannot be used easily in awkward situations or confined spaces.

An object of this invention is to provide a saw, especially a hacksaw, that may be used in a variety of situations.

SUMMARY OF THE INVENTION

According to the invention there is provided a saw, especially a hacksaw, comprising a blade holder, a handle for the blade holder at one end thereof and a saw blade detachably coupled to the blade holder, characterised in that the orientation of the blade relative to the handle is adjustable and/or the angle of the handle relative to the blade holder is adjustable.

The orientation of the blade is preferably adjustable through 90°, although it is not beyond the scope of the invention for the orientation of the blade to be adjustable through 180° or even 360°.

The blade holder is preferably elongate and preferably has at each end two or more blade attachment locations, so that the blade may be attached in a range of orientations relative to the blade holder. Preferably the two orientations are at right angles to each other.

Preferably the blade attachment locations at the handle end thereof are provided on a member that is rotatable relative to the blade holder. The rotatable member is preferably connected to the handle but preferably separable therefrom. The member may be screw threadedly connected to the handle. That may have the advantage that the blade can be tensioned by screwing the handle to the member to draw it away from the other end of the blade holder.

In order to adjust the angle of the handle relative to the blade holder, it is preferred that a part of the handle or the rotatable member connected thereto extend through a passage in a block or the like, which passage is angled relative to a longitudinal axis of the block. Thus, by rotating the block about its longitudinal axis the angle of the handle may be adjusted. The block or the like is preferably mounted in a holder therefor at the handle end of the blade holder. The holder for the block preferably has a circular section passage for the block the axis of which is at an angle to the blade holder.

The rotatable member preferably has its blade attachment locations on a part thereof offset relative to a longitudinal axis of the member, whereby turning the member through 180° the blade may be attached closer to or further away from the blade holder at that end thereof.

Generally the blade will be fixed relatively closely to the blade holder along its length. However, for some purposes it may be advantageous to have a greater spacing between the blade and the blade holder. To achieve that, an extension piece may be provided that is attachable to said one end of the blade holder and which provides blade attachment locations at its free end. The extension piece may conveniently be stored in the handle of the saw, for which purpose the handle is preferably hollow and preferably has a removable cap at its free end.

The blade attachment locations are preferably lugs to fit corresponding holes of the blades near their ends, a blade being retained on the blade holder by tensioning thereof. The lugs may have lips extending away from the blade end to assist retention of a blade on the lugs.

BRIEF DESCRIPTION OF THE DRAWINGS

This invention will now be further described, by way of example only, with reference to the accompanying drawings, in which:

FIGS. 2 to 8 show the saw of FIG. 1 with either or both of the handle or the blade in a different orientation;

FIGS. 12A and 12B are views showing the additional component used in the saw shown in FIGS. 9, 10 and 11;

FIG. 13 shows detail of the handle of the saw of FIG. 1;

FIGS. 16A, 16B and 16C are respectively top side and sectional views of one end of a spine of the saw of FIG. 1;

FIG. 17 shows a further component of the saw of FIG. 1; and

DESCRIPTION OF THE PREFERRED EMBODIMENT

Figure 1:
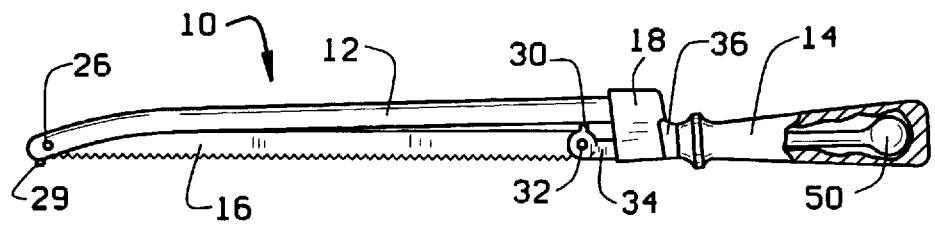
FIG. 1 shows a saw of the invention with its blade and handle in one orientation.

Referring to the accompanying drawings, a saw 10 generally comprises a spine 12, a handle 14 and a blade 16. The spine 12 is fixed at one end to a block 18 which has a passage 20 through it. The other end of the spine 12 is curved and slotted at 24. On opposite sides of the spine at its slotted end are lugs 26, on to which the saw blade can be located, as well as a lug 28 in the slot 24. The slot 24 is actually stepped to allow a blade to be fitted onto the lug 28 before being moved to occupy the narrower part of the slot. A further lug 29 is provided on the underside of the spine nearly at right angles to the lugs 26.

The other end of the blade 16 is attached to one of two lugs 30, 32 at right angles to each other on one end of a tensioning screw member 34. The lugs 26, 30 and 32 each have a small lip 33 extending away from their end of the blade 16 in order to assist retention of the blade thereon. The screw member 34 extends through tubular member 36 which fits in the block 18 in different radial positions. The tubular member 36 itself has a passage 37 through it that is angled relative to the longitudinal axis of the member. Thus, the angle of the screw member 34 may be altered relative to the spine 12 by rotating the tubular member 36 in the block 18.

The block 18 has a projection 40 on its end face 42 and the tubular member 36 has a flange 44 with four spaced recesses 46. One of the recesses 46 locates the member 36 relative to the block by fitting over the projection 40. Thus, the tubular member 36 and hence the screw member 34 can be located at four different angles relative to the spine 12.

The screw member 34 has its lugs 30, 32 on an end part 48 that is offset relative to a longitudinal axis of the screw member 34. Thereby rotating the screw member 34 and tubular member 36 relative to each other and to the spine 12 the blade 16 will be positioned closer to or further away from the spine or in line with or to either side of the spine.

The handle 14 is attached to the screw member 34 and bears against the tubular member 36, so that screwing the handle onto the screw member 34 increases tension on the blade 16.

For some purposes it may be desirable to have a greater distance between the blade 16 and the spine 12. To that end an extension piece 50 is provided, which is conveniently stored in a chamber 52 in the handle closed by a screw threaded cap 54. The extension piece 50 has a first end 56 that locates rigidly on the free end of the spine 12. The end 56 is enlarged in section relative to the remainder thereof and has a blind bore 58 into which the free end of the spine 12 fits. At the entrance to the bore 58 is a small nib 59 which locates in the slot 24 at the end of the spine 12 to prevent the extension piece rotating around the end of the spine. At its other end, the extension piece 50 has a pair of lugs 60, 62 onto which a blade can locate in either of two orientations at right angles to each other. The lug 62 has a lip 63 similar to lip 33.

Because of the provision of blade attachment locations at angles to each other, the adjustable angle of the screw tensioning member 34 and the extension piece 50, the illustrated saw can be assembled in a variety of ways including to alter the orientation of the blade 16 relative to the spine 12, the spacing of the blade relative to the spine 12 and the angle of the handle 14 relative to the spine 12.

Figure 2:
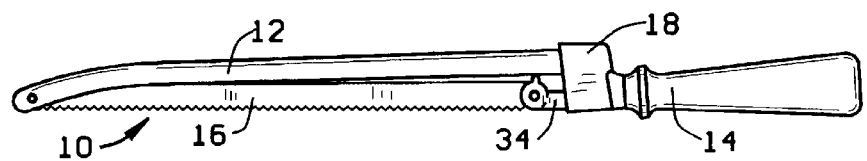

In FIGS. 1 and 2, the blade is in the same plane as the spine and relatively close thereto. The handle is substantially in line with the blade.

Figure 3:
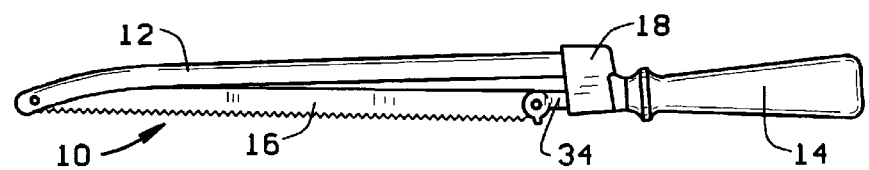

In FIG. 3, the screw member 34 has been turned through 180° to increase the angle between the blade and the spine compared to FIGS. 1 and 2.

Figure 4:
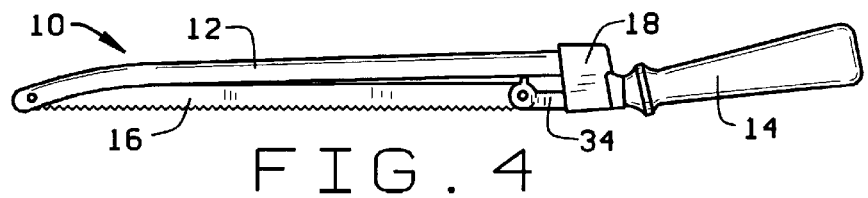

In FIG. 4, the member 36 has been turned through 180° compared to FIGS. 1 and 2, so that the handle is angled relative to the blade.

Figure 5:
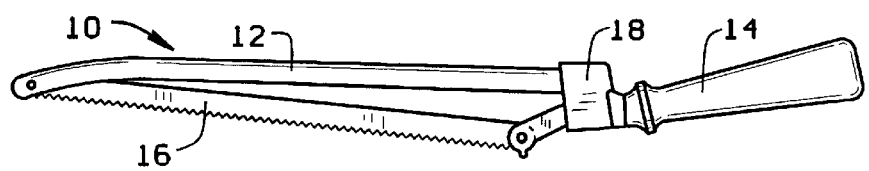

In FIG. 5, both the member 36 and the screw member 34 have been turned through 180° compared to FIGS. 1 and 2 to increase the angle between the spine and the blade and the angle of the handle relative to the blade.

Figure 6:
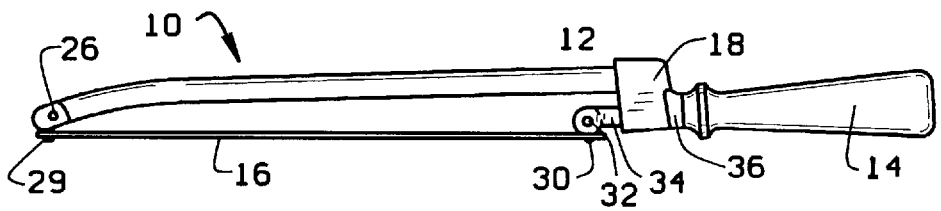

In FIG. 6 the blade is at right angles to the plane of the spine with the handle substantially in line therewith.

Figure 7:
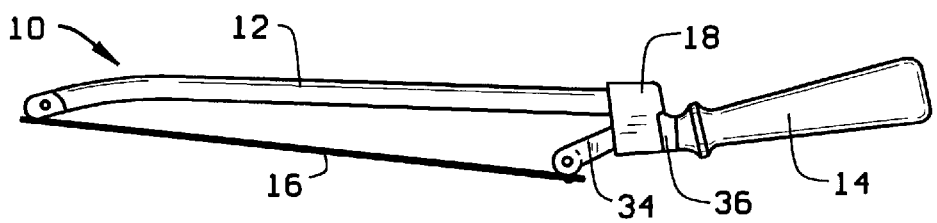

In FIG. 7 the screw member 34 and the member 36 have been turned through 180° relative to their positions in FIG. 2, so that the handle is now inclined relative to the blade and there is a greater overall spacing between the blade and the spine.

In FIG. 8, the member 36 and the screw member 34 have been rotated so that the blade and the handle are inclined relative to the plane of the spine.

Figure 9:
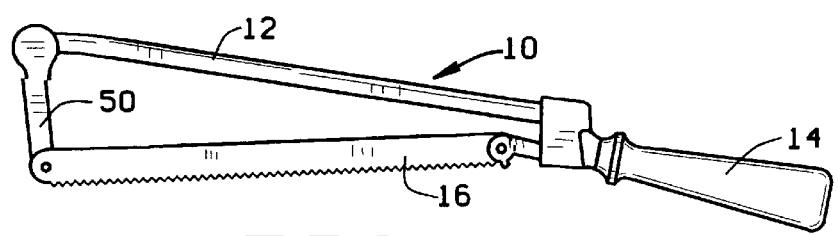
Figure 15A:
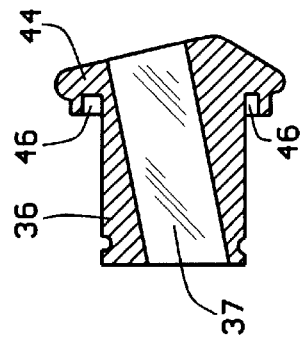
FIGS. 15A, 15B and 15C are respectively section, end and perspective views of a component of the saw of FIG. 1.
Figure 15B:
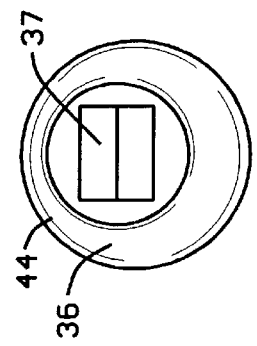
Figure 14A:
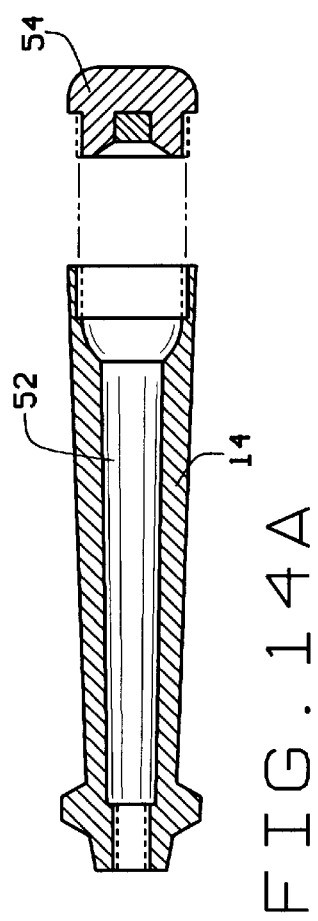
FIGS. 14A and 14B show further handle detail.
Figure 14B:
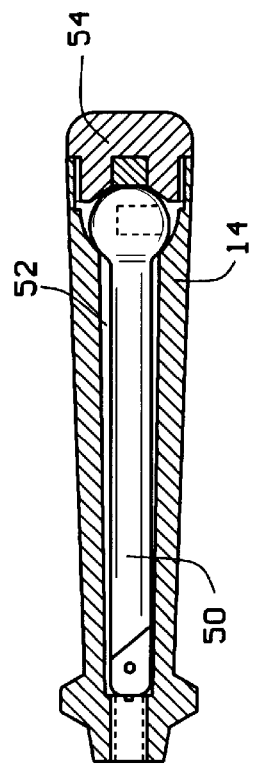
Figure 15C:
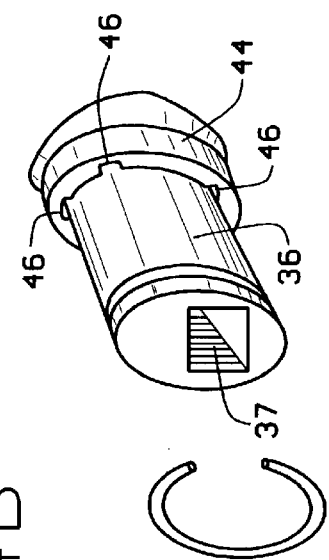

In FIG. 9 the extension piece So has been added and the screw member 34 turned through 180° compared to FIG. 1.

Figure 10:
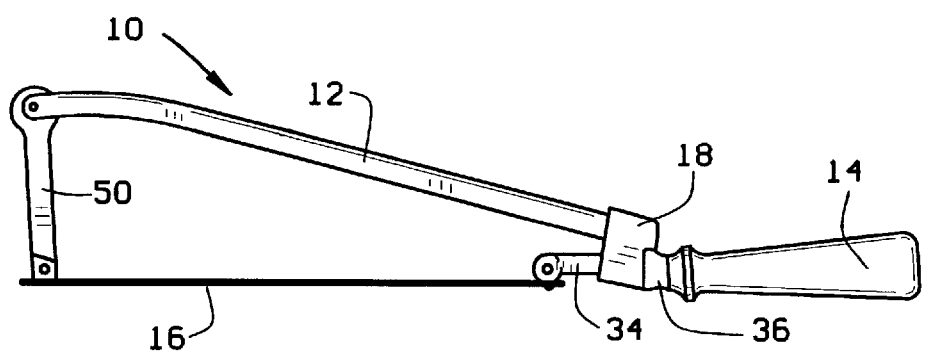
FIGS. 9, 10 and 11 show the saw of FIG. 1 with an additional component whereby further blade and handle orientation permutations are achieved.

In FIG. 10 the blade has been reattached at 90° compared to FIG. 9 and the member 36 turned through 180° to put the handle in line with the blade.

Figure 11:
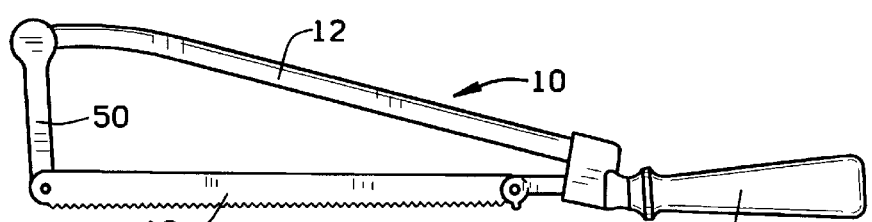

Finally in FIG. 11 compared to FIG. 9, the member 36 has been turned through 180° so that the handle is in line with the blade.

Figure 18:
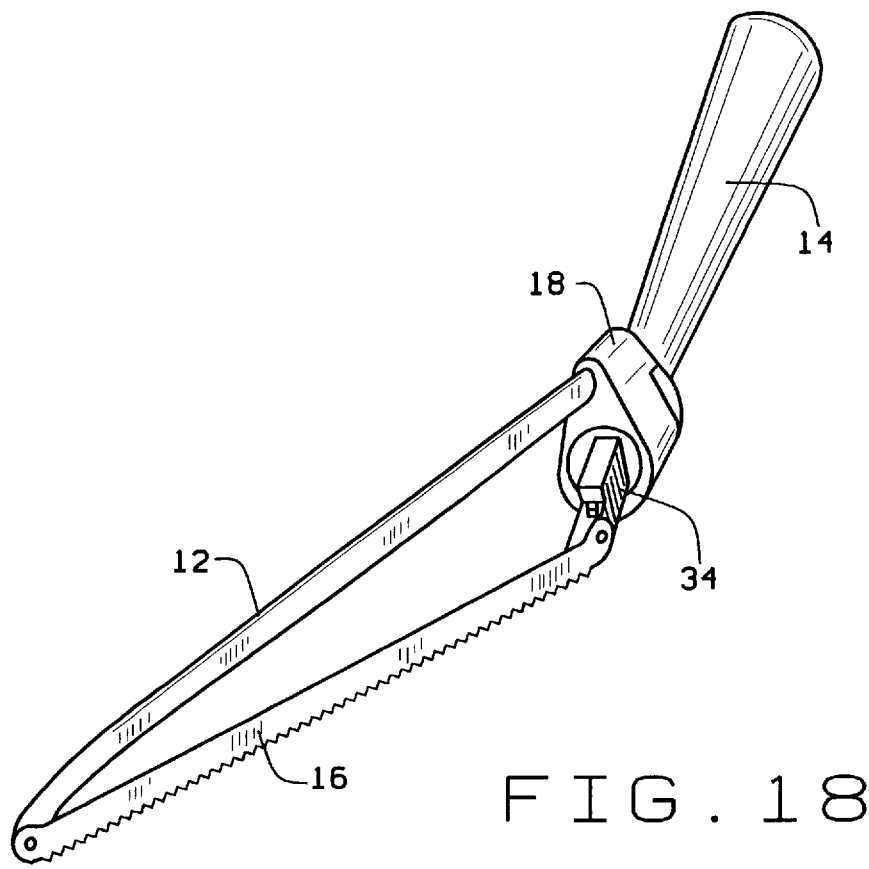
FIGS. 18 and 19 show two further saw configurations.
Figure 19:
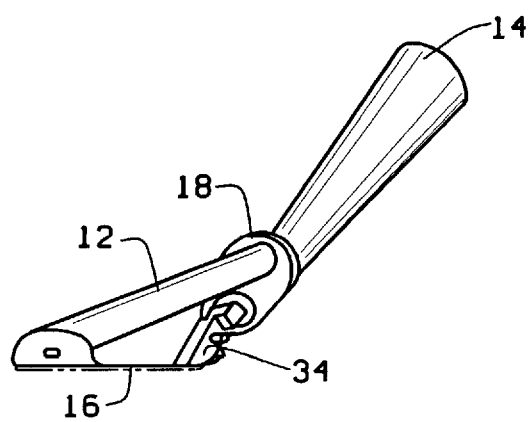

Finally, FIGS. 18 and 19 show two further saw configurations, which allow the blade 16 to cut completely into a corner and to cut flush to surfaces with the blade perpendicular to and parallel to surfaces.

I claim:

1. A saw comprising a handle having a tensioning screw member extending therefrom, the tensioning screw member having an end remote from the handle and an attachment lug on the end of the tensioning screw member, a hollow first member having a second member rotatable in said hollow first member and having a longitudinal axis, a passage through the rotatable member angled relative to the rotatable member longitudinal axis, the tensioning screw member of the handle being fitted through said passage, a spine extending from the first hollow member oppositely to the handle and having an end remote therefrom, an attachment lug on the end of the spine, a blade having two spaced ends and a hole near each end, one blade hole is fitted onto the blade attachment lug of the tensioning screw member and the other blade hole is fitted onto the blade attachment lug of the spine, wherein by rotating the rotatable member about the rotatable member longitudinal axis, an orientation of the handle is adjustable relative to the spine.

2. A saw as claimed in claim 1, wherein the blade has a longitudinal axis and an orientation of the blade about the blade longitudinal axis is adjustable.

3. A saw as claimed in claim 2, wherein the orientation of the blade is adjustable through 180°.

4. A saw as claimed in claim 2, wherein the orientation of the blade is adjustable through 90°.

5. A saw as claimed in claim 1, wherein the spine has two or more blade attachment lugs.

6. A saw as claimed in claim 5, wherein the spine blade attachment lugs are at right angles to each other.

7. A saw as claimed in claim 1, wherein the tensioning screw member and handle are separable.

8. A saw as claimed in claim 7, wherein the tensioning screw member is screw-threadedly connected to the handle.

9. A saw as claimed in claim 1, wherein the tensioning screw member of the handle has a longitudinal axis and has a part thereof offset relative to the tensioning screw member longitudinal axis, the blade attachment lugs being on said offset part.

10. A saw as claimed in claim 1 further comprising an extension piece having two ends, one end being attached to said remote end of the spine and the other end having blade attachment lugs.

11. A saw as claimed in claim 10, wherein the handle of the saw is hollow and said extension piece is stored in the handle.

12. A saw as claimed in claim 1, wherein the attachment lugs have lips extending towards the blade ends.

13. A saw comprising:
   a handle;
   a tensioning screw member extending from the handle, the tensioning screw member having a distal end;
   an attachment lug on the distal end of the tensioning screw member;
   a block having a first passage extending therethrough, the first passage having a first axis;
   a tubular member mounted in the first passage for rotation of the tubular member in the first passage relative to the block, the tubular member having a second passage extending therethrough, the second passage having a second axis that is oriented at an angle relative to the first axis and the tensioning screw member extends through the second passage;
   a spine extending from the block away from the handle to a distal end of the spine;
   an attachment lug on the distal end of the spine; and a saw blade having opposite first and second ends with a first hole adjacent the first end and a second hole adjacent the second end of the saw blade, the first hole is fitted onto the attachment lug on the distal end of the tensioning screw member and the second hole is fitted onto the attachment lug on the distal end of the spine, whereby rotation of the tubular member in the first passage of the block selectively increases and decreases an angle of orientation of the handle relative to the spine.

14. The saw of claim 12, wherein:

the blade has an axis and the blade is rotatable about the blade axis in response to rotating the handle relative to the block.

15. The saw of claim 13, wherein:

the distal end of the spine has a plurality of attachment lugs.

16. The saw of claim 15, wherein:

at least two attachment lugs of the plurality of blade attachment lugs of the spine are oriented at right angles to each other.

17. The saw of claim 13, wherein:

the tensioning screw member and handle are separable from each other.

18. The saw of claim 13, wherein:

the tensioning screw member has a center axis and the distal end of the tensioning screw member is offset to one side of the center axis, and the attachment lug on the distal end of the tensioning screw member is on the offset.

19. The saw of claim 13, further comprising:

an extension piece having opposite first and second ends with the first end being attachable to the distal end of the spine and the second end having attachment lugs for the saw blade thereon.

20. The saw of claim 19 wherein:

the handle has a hollow interior chamber that is sufficiently large to receive the extension piece therein.

\* \* \* \* \*